United States Patent

Gertsch et al.

[11] 4,270,452
[45] Jun. 2, 1981

[54] DUCTOR DRIVE

[75] Inventors: Peter Gertsch; Robert Imhof, both of Berne, Switzerland

[73] Assignee: Maschinenfabrik Wifag, Switzerland

[21] Appl. No.: 98,029

[22] Filed: Nov. 28, 1979

[30] Foreign Application Priority Data

Dec. 14, 1978 [CH] Switzerland .................. 12886/78

[51] Int. Cl.³ .................. B41F 7/40; B41F 31/14; B41L 25/16; B41L 27/16
[52] U.S. Cl. .................. 101/148; 101/350; 101/DIG. 6
[58] Field of Search .......... 101/349, 350, 351, 352, 101/148, 206, 207, 209, 356, 357, 358, 360, 361, 362, DIG. 6, 305, 309, 314, 320, 323, 326; 74/768, 769, 773, 781 R

[56] References Cited

U.S. PATENT DOCUMENTS

| | | | |
|---|---|---|---|
| 1,452,043 | 4/1923 | Harrold | 101/363 |
| 1,927,759 | 9/1933 | Spence | 101/356 |
| 1,980,639 | 11/1934 | Schlesinger | 101/350 |
| 2,120,978 | 6/1938 | Huck | 101/350 |
| 2,262,470 | 11/1941 | Schlesinger | 101/356 |

FOREIGN PATENT DOCUMENTS

| | | | |
|---|---|---|---|
| 506823 | 10/1954 | Canada | 101/352 |
| 2606590 | 11/1976 | Fed. Rep. of Germany | 101/350 |
| 2610126 | 12/1976 | Fed. Rep. of Germany | 101/350 |

Primary Examiner—J. Reed Fisher
Attorney, Agent, or Firm—McGlew & Tuttle

[57] ABSTRACT

An apparatus for cyclically decelerating and accelerating a ductor roller which has a journal which is mounted on a swing arm for rotation on the arm and is moved with the arm to selectively and alternatively engage the ductor roller with a first roller, such as a fountain roller and a second roller, such as a first roller of a printing press, is employed in inking and damping units of such presses. The apparatus includes a bearing head of the spring arm which provides a rotatable mounting for the journal of the ductor roller and the arrangement includes a planetary gear system connected to the journal and to a free wheel element with a controllable brake acting between the planetary gear system and the bearing head of the swing arm in an arrangement which permits the free wheel element to rotate after the braking system has been engaged to cause the winding or tensioning of a spring, such as a spiral spring, which is disposed between the free wheel element and the journal of the ductor roller.

2 Claims, 2 Drawing Figures

DUCTOR DRIVE

FIELD AND BACKGROUND OF THE INVENTION

This invention relates to printing mechanisms in general and, in particular, to a new and useful apparatus for cyclically decelerating and accelerating a ductor roller which has a journal mounted on a bearing head of a spring arm which is movable with the spring arm to selectively and alternatively engage between two separate additional rollers.

As is well known, the function of a ductor roller in inking and damping units of printing presses is to transfer the liquid taken up from a reservoir by a fountain roller which is driven at a relatively low peripheral speed, cyclically to the first roller, running at a higher speed corresponding to that of the press of the inking or damping system, with the desired amount of liquid to be transferred being determined by controlling the number of springing motions of the ductor roller. The ductor roller itself is not usually driven. In such a case, the roller is taken along by friction, alternately by the fountain roller and the first roller of the distributing system.

Due to these unequal peripheral speeds of the fountain roller and the distributing roller, the ductor roller is periodically braked and accelerated. This results in an irregular transfer of the liquid, more or less unfavorably affecting the printing product, depending on the differential peripheral speed.

With the common speeds of printing presses today, the differences in peripheral speeds amount to values which can no longer ensure a neat transfer of liquid by ductor rollers which are taken along only by friction.

German Offenlegungschrift No. 26 06 590 discloses a damping or inking unit comprising a ductor roller which can be braked from the high to the low speed by a braking mechanism. The construction of this reference, which is relatively expensive, makes it possible to brake the ductor roller from a high to a low peripheral speed. However, means for reaccelerating to the high peripheral speed is not provided with this arrangement.

The ductor drive disclosed in German Pat. No. 26 101 26 theoretically makes it possible to adjust the peripheral speed of the ductor roller to both the low peripheral speed of the fountain roller and to the high peripheral speed of the first distributing roller of the damping or inking system. However, the solution provided is expensive.

Experience has shown that, within certain limits, a slip occurring as the ductor roller applies against the fountain roller or the first distributing roller does not result in any perceivable impairment of the product of printing.

SUMMARY OF THE INVENTION

The present invention starts from such experience and is directed to a drive which makes it possible to reduce or increase the peripheral speed of a ductor roller in a simple manner. This is obtained, in accordance with the invention, by providing that in at least one bearing head associated with the ductor roller, an automatic decelerating and accelerating mechanism is associated therewith.

In accordance with the invention, there is provided an apparatus for cyclically decelerating and accelerating a ductor roller which has a journal which is mounted within a bearing head of a swing arm so that it may be rotated in the bearing head and also moved with the arm to selectively engage the ductor roller with first and second additional rotatable rollers and which includes an automatically operating decelerating or accelerating mechanism associated with the ductor roller and the bearing head for controlling the rotational speed of the ductor roller.

A further object of the invention is to provide an apparatus for rotatably mounting and controlling the speed of a ductor roller which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

DESCRIPTION OF THE PREFERRED EMBODIMENT

Figure 1:
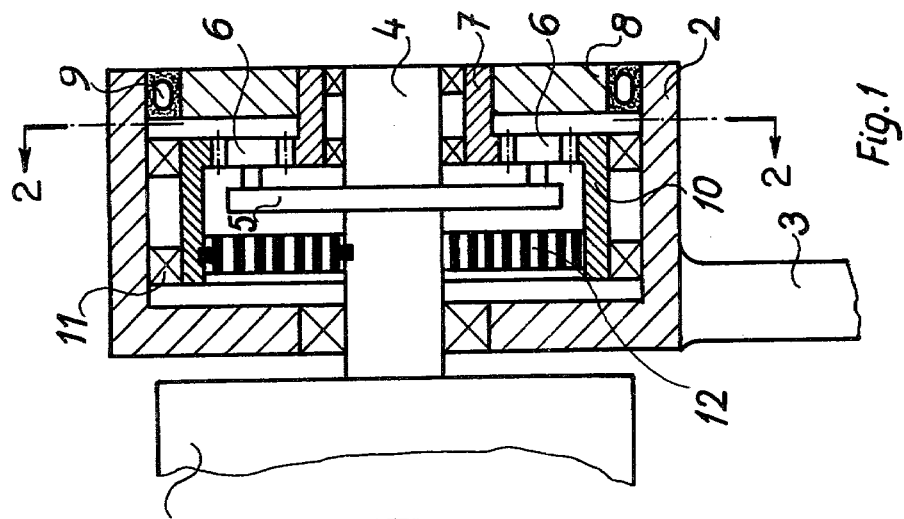
FIG. 1 is an axial sectional view of the apparatus for controlling the rotational speed of a ductor roller constructed in accordance with the invention and employed on a printing press inking system.
Figure 2:
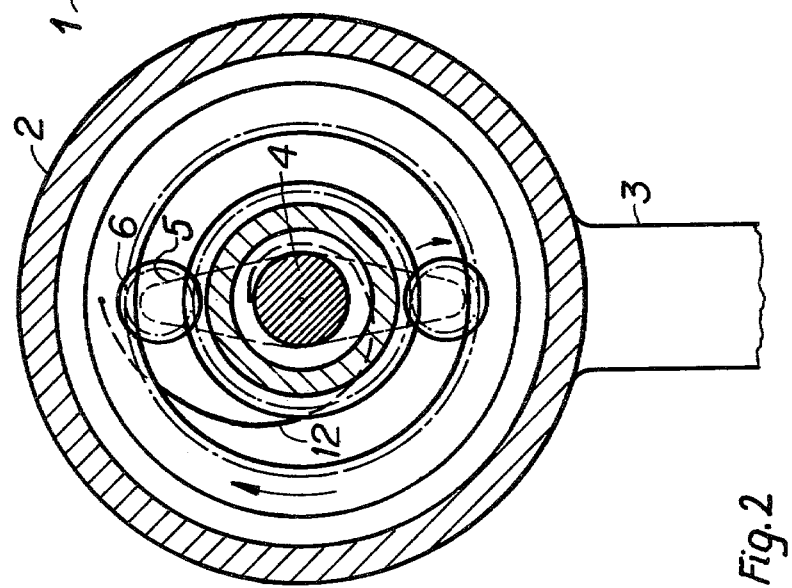
FIG. 2 is a sectional view taken along the line 2—2 of FIG. 1.

Referring to the drawing in particular, the invention embodied therein, comprises, an apparatus for cyclically decelerating and accelerating a ductor roller 1 which has a journal 4 which is mounted in a bearing head 2 of the swing arm and which is adapted to move with the swing arm to selectively and alternatively engage the ductor roller with first and second additional rotatable rollers, for example, in an inking end or damping unit of printing presses, which have not been shown. Either side of the ductor roller 1 is mounted for rotation in the bearing head 2 carried by a swing arm 3.

In accordance with the invention, the journals 4 of the ductor roller support a planet carrier 5 of an epicyclic gearing. The planet carrier 5 is firmly secured to the journal 4 and carries planet pinions 6 which mesh with a central gear 7 on one side, with the central gear 7 being fixedly connected to a brake flange 8. The central gear 7 and brake flange 8 are mounted together for free rotation on journal 4. Brake flange 8 is connected to bearing head 2 through a conventional, controllable brake means including a brake 9, e.g., by inflating the brake 9 to engage between brake flange 8 and bearing head 2.

On their other side, planet pinions 6 mesh with the internal teeth of an internal gear 10 which is mounted for unidirectional free rotation in bearing head 2, by means of at least one free wheel element 11 and is connected through a spring element 12, for example a spiral spring, to the journal 4.

MODE OF OPERATION

As long as ductor roller 1 applies against a first roller of the inking or damping system (not shown), brake 9 is released, so that the entire epicyclic gearing rotates in synchronism with ductor roller 1.

As ductor roller 1 is swung back, the start of the swinging motion causes a switching element known per se and not shown to apply the brake 9 against braking flange 8, whereby, rotation of the central gear 7 is blocked. Since ductor roller 1 and carrier 5 keep rotating due to their inertia, the action of planet pinions 6 imparts an angular speed to internal gear 10 which is higher than the angular speed of journal 4, whereby, spring element 12 is tensioned and ductor 1 is braked. Spring element 12 is further tensioned during the short period during which the ductor roller 1 applies against the fountain roller.

As soon as ductor roller 1 starts to swing away from the fountain roller, brake 9 is released through its control, known per se, so that the energy accumulated in spring element 12 accelerates the rotary motion of ductor roller 1. Relaxing of spring element 12 through internal gear 10 is prevented by free wheel element 11.

While a specific embodiment of the invention has been shown and described in detail to illustrate the application of the principles of the invention, it will be understood that the invention may be embodied otherwise without departing from such principles.

What is claimed is:

1. An apparatus for cyclically decelerating and accelerating a ductor roller which has a journal which is mounted in a bearing head of a swing arm for rotation and which is movable with the swing arm to selectively and alternatively engage the ductor roller with first and second additional rotatable rollers in a liquid transfer unit of a printing press, comprising, a free rotating element located in the bearing head for free rotation, a planetary gear mechanism connected to the journal and to said free rotating element, controllable brake means disposed between the bearing head and said planetary gear mechanism for stopping rotation of a portion of the planetary gear mechanism and tensionable spring means disposed between said free rotating element and said journal which is tensionable upon application of the brake to stop the planetary gear mechanism by the continued rotation of said free rotating element.

2. An apparatus for cyclically decelerating and accelerating a ductor roller which has a journal mounted on a swing arm for rotation and which is moved with the swing arm to selectively and alternatively engage the ductor roller with first and second additional rollers in a liquid transfer unit of a printing press, comprising a planet carrier affixed to said journal, a central sun gear freely rotatable on said journal, a plurality of planetary gears rotatably mounted on said carrier around said central sun gear and in meshing engagement with said sun gear, a bearing head affixed to the arm, a wheel element mounted in said bearing head for free rotation therein, an internal gear mounted on said free wheel element and engaged with said planetary gears, controllable brake means engageable between said central sun gear and said bearing head for stopping said central sun gear and tensionable spring means connected between said internal gear and said journal which is tensionable by said free wheel element when said brake is engaged with said central gear to prevent rotation thereof.

* * * * *